US010189475B2

(12) United States Patent
Shiraishi (10) Patent No.: US 10,189,475 B2
(45) Date of Patent: Jan. 29, 2019

(54) VEHICLE CONTROL APPARATUS

(71) Applicant: Mazda Motor Corporation, Aki-gun, Hiroshima (JP)

(72) Inventor: Daisaku Shiraishi, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 129 days.

(21) Appl. No.: 15/496,450

(22) Filed: Apr. 25, 2017

(65) Prior Publication Data

US 2017/0313316 A1 Nov. 2, 2017

(30) Foreign Application Priority Data

Apr. 27, 2016 (JP) ................................. 2016-089174

(51) Int. Cl.
| | |
|---|---|
| *B60W 30/18* | (2012.01) |
| *B60W 10/06* | (2006.01) |
| *B60W 10/11* | (2012.01) |
| *B60W 50/06* | (2006.01) |
| *B60W 50/00* | (2006.01) |

(52) U.S. Cl.
CPC ...... *B60W 30/18072* (2013.01); *B60W 10/06* (2013.01); *B60W 10/11* (2013.01); *B60W 50/06* (2013.01); *B60W 2030/1809* (2013.01); *B60W 2050/0095* (2013.01); *B60W 2510/068* (2013.01); *B60W 2510/1005* (2013.01); *B60W 2520/10* (2013.01); *B60W 2520/105* (2013.01); *B60W 2540/10* (2013.01); *B60W 2540/103* (2013.01); *B60W 2540/12* (2013.01); *B60W 2710/065* (2013.01); *B60W 2710/0655* (2013.01); *B60W 2710/1005* (2013.01); *Y02T 10/76* (2013.01)

(58) Field of Classification Search
None
See application file for complete search history.

(56) References Cited

U.S. PATENT DOCUMENTS

2015/0329119 A1* 11/2015 Sujan ...................... F02D 41/08
701/54

FOREIGN PATENT DOCUMENTS

JP 3196490 B2 8/2001

* cited by examiner

*Primary Examiner* — Ramya P Burgess
*Assistant Examiner* — Timothy Hannon
(74) *Attorney, Agent, or Firm* — Alleman Hall Creasman & Tuttle LLP (57) ABSTRACT

Provided is a control apparatus of a vehicle, which includes a transmission mode switching control program for controlling the automatic transmission to switch between an automatic transmission mode and a manual transmission mode, a coast idle stop control program for performing a coast idle stop control in which the engine is stopped automatically and the automatic transmission is changed into a neutral position while the vehicle is traveling, and a coast idle control program for performing a coast idle control in which the engine is made running idle and the automatic transmission is changed into the neutral position while the vehicle is traveling.

20 Claims, 6 Drawing Sheets

VEHICLE CONTROL APPARATUS

BACKGROUND

The present invention relates to a control apparatus of a vehicle which includes an engine and an automatic transmission.

Conventionally, JP3196490B2 discloses a device in which, when a vehicle is traveling and performing a gentle slowdown, an engine is stopped automatically and an automatic transmission is changed into a neutral position (i.e., a coast idle stop control is performed), for example. According to the device, fuel consumption is improved by the automatic engine stop, and a less excessive slowdown sensation is given to a vehicle operator who wants the vehicle to perform a coast traveling (inertia traveling) than a case where the engine is stopped automatically and the automatic transmission is changed into a non-neutral position.

When the vehicle performs the coast traveling, it is desirable to perform a coast idle stop control as disclosed in JP3196490B2 in terms of achieving both the improvement of fuel consumption and the less excessive slowdown sensation.

If the operator again steps on an accelerator pedal to give a re-acceleration request while the coast idle stop control is performed, the engine is started and the automatic transmission is changed into the non-neutral position (i.e., given engageable elements are engaged) in order to respond to the re-acceleration request. Moreover, if the operator steps on the brake pedal while the coast idle stop control is performed, this means that the operator requests a greater slowdown than that of the coast traveling (i.e., requesting an engine brake). Therefore, the engine is started and the automatic transmission is changed into the non-neutral position in order to respond to the engine-brake request.

Thus, when the operator requests the re-acceleration or engine brake while the coast idle stop control is performed, the engine is started and the automatic transmission is changed into the non-neutral position in order to respond to such a request. However, since the engine starting especially takes time, it may cause a bad response to the operator's re-acceleration or engine-brake request.

In such a case, in order to perform the coast traveling, a coast idle control may be performed in which the engine is made running idle and the automatic transmission is changed into the neutral position.

Although the coast idle control improves the response to the operator's re-acceleration or engine-brake request while the control is performed, an improvement of fuel consumption may be insufficient because the engine runs idle.

SUMMARY

The present invention is made in view of the issues described above and aims to provide a control apparatus of a vehicle, which acquires an improvement of fuel consumption as much as possible, and achieves a quick response to an operator's re-acceleration or engine-brake request as needed.

According to one aspect of the present invention, a control apparatus of a vehicle is provided. The vehicle includes an engine, and an automatic transmission provided in a power transmission path between the engine and wheels. The control apparatus includes one or more processors configured to execute a transmission mode switching control program for controlling the automatic transmission to switch between an automatic transmission mode in which a gear ratio of the automatic transmission is changed automatically according to a traveling state of the vehicle and a manual transmission mode in which the gear ratio is changed manually by an operation of an operator of the vehicle, a coast idle stop control program for performing a coast idle stop control in which the engine is stopped automatically and the automatic transmission is changed into a neutral position while the vehicle is traveling, a coast idle control program for performing a coast idle control in which the engine is made running idle and the automatic transmission is changed into the neutral position while the vehicle is traveling, and a coast traveling control program for causing the coast idle stop control program to perform the coast idle stop control or causing the coast idle control program to perform the coast idle control when a given coast traveling condition is satisfied. The given coast traveling condition is a condition in which a vehicle speed is faster than a given speed, a stepping-on amount of an accelerator pedal by the operator is less than a first given amount, and a stepping-on amount of a brake pedal by the operator is less than a second given amount. After the given coast traveling condition is satisfied, when the transmission mode switching control program controls the automatic transmission in the automatic transmission mode, the coast traveling control program causes the coast idle stop control program to perform the coast idle stop control, and when the transmission mode switching control program controls the automatic transmission in the manual transmission mode, the coast traveling control program causes the coast idle control program to perform the coast idle control.

After the given coast traveling condition is satisfied, when the automatic transmission is controlled in the automatic transmission mode, the improvement of fuel consumption is fully acquired because the coast idle stop control is performed. Then, when a re-acceleration or engine-brake is requested by the operator while the coast idle stop control is performed, the engine is started and the automatic transmission is changed into a non-neutral position in order to respond to such a request. Therefore, the response to this request may become slow. However, the operator has normally selected the automatic transmission mode in such a case, and he/she then selects the manual transmission mode if he/she wants to enjoy a sporty drive. Therefore, when the operator has selected the automatic transmission mode, it is rare for the operator to demand a quick response to the operator's re-acceleration or engine-brake request. That is, there is no problem even if the response to the request is slow. On the other hand, after the given coast traveling condition is satisfied, when the automatic transmission is controlled in the manual transmission mode, a quick response to the operator's re-acceleration or engine-brake request is needed. Here, since the engine has already been operated when the re-acceleration or engine-brake is requested by the operator, the quick response is now achieved.

While the coast idle stop control is performed by the coast idle stop control program, when the transmission mode switching control program switches the mode from the automatic transmission mode to the manual transmission mode, the coast traveling control program may cause the coast idle control program to perform the coast idle control.

Thus, even while the coast idle stop control is performed, the control is shifted to the coast idle control corresponding to the switching from the automatic transmission mode to the manual transmission mode by the transmission mode switching control program. Therefore, the quick response to the operator's re-acceleration or engine-brake request is obtained.

While the coast idle stop control is performed by the coast idle stop control program, when a rate of change in the vehicle speed is greater than a given rate of change, the coast traveling control program may cause the coast idle control program to perform the coast idle control.

Thus, while the coast idle stop control is performed, when the rate of change in the vehicle speed (including both cases when the vehicle speed changes faster and slower) is greater than a given rate of change, since a possibility that the operator will perform the re-acceleration or engine-brake request becomes higher, the control is shifted to the coast idle control. Therefore, the quick response to the operator's re-acceleration or engine-brake request is obtained.

While the coast idle control is performed by the coast idle control program, when the transmission mode switching control program switches the mode from the manual transmission mode to the automatic transmission mode, the coast traveling control program may cause the coast idle stop control program to perform the coast idle stop control.

Thus, even while the coast idle control is performed, the control is shifted to the coast idle stop control corresponding to the switching from the manual transmission mode to the automatic transmission mode by the transmission mode switching control program. Therefore, fuel consumption is improved as much as possible.

During the execution of the coast idle control by the coast idle control program, when the rate of change in the vehicle speed is less than a preset rate, the coast traveling control program may cause the coast idle stop control program to perform the coast idle stop control.

Thus, while the coast idle control is performed, when the rate of change in the vehicle speed (including both cases when the vehicle speed changes faster and slower) is less than the preset rate, since a possibility that the operator will perform the re-acceleration or engine-brake request becomes lower, the control is shifted to the coast idle stop control. Therefore, fuel consumption is improved as much as possible.

An emission control device may be provided in an exhaust passage of the engine. The control apparatus may further include an emission control device temperature detector for detecting a temperature of the emission control device. When the temperature of the emission control device detected by the emission control device temperature detector is higher than an activation temperature of a catalyst of the emission control device and lower than a given temperature that is higher than the activation temperature of the catalyst, and even when the transmission mode switching control program controls the automatic transmission in the automatic transmission mode after the given coast traveling condition is satisfied, the coast traveling control program may cause the coast idle control program to perform the coast idle control.

Thus, since the coast idle control is always performed when the temperature of the emission control device is higher than the activation temperature of the catalyst of the emission control device and lower than the given temperature, the temperature of the emission control device is prevented from falling below the activation temperature. The given temperature is a maximum value of the temperature of the emission control device which becomes lower than the activation temperature when the coast idle stop control is performed.

When a shift stick of the vehicle is at a drive range, and a downshift or an upshift using a manual transmission operating member provided separately from the shift stick is performed by the operator, the transmission mode switching control program may temporarily control the automatic transmission in the manual transmission mode. The manual transmission mode when the coast traveling control program causes the coast idle control program to perform the coast idle control may include the manual transmission mode when the transmission mode switching control program temporarily controls the automatic transmission in the manual transmission mode.

Thus, also while the automatic transmission is temporarily controlled in the manual transmission mode, the quick response to the operator's re-acceleration or engine-brake request is needed. Since the coast idle control is also performed in such a case, the quick response is achieved.

According to another aspect of the present invention, a control apparatus of a vehicle including an engine, and an automatic transmission provided in a power transmission path between the engine and wheels, is provided. The control apparatus includes one or more processors configured to execute a transmission mode switching control program for controlling the automatic transmission to switch between an automatic transmission mode in which a gear ratio of the automatic transmission is changed automatically according to a traveling state of the vehicle and a manual transmission mode in which the gear ratio is changed manually by an operation of an operator of the vehicle, a coast idle stop control program for performing a coast idle stop control in which the engine is stopped automatically and the automatic transmission is changed into a neutral position while the vehicle is traveling, and a coast idle control program for performing a coast idle control in which the engine is made running idle and the automatic transmission is changed into the neutral position while the vehicle is traveling. After a given coast traveling condition is satisfied, when the transmission mode switching control program controls the automatic transmission in the automatic transmission mode, the coast idle stop control program performs the coast idle stop control, and when the transmission mode switching control program controls the automatic transmission in the manual transmission mode, the coast idle control program performs the coast idle control.

According to another aspect of the present invention, a control apparatus of a vehicle including an engine, and an automatic transmission provided in a power transmission path between the engine and wheels, is provided. The control apparatus includes a selected range detector for detecting which range is selected, between a drive range in which a gear ratio of the automatic transmission is changed automatically according to a traveling state of the vehicle and a manual range in which the gear ratio is changed manually by an operation of an operator of the vehicle, one or more processors configured to execute a coast idle stop control program for performing a coast idle stop control in which the engine is stopped automatically and the automatic transmission is changed into a neutral position while the vehicle is traveling, and a coast idle control program for performing a coast idle control in which the engine is made running idle and the automatic transmission is changed into the neutral position while the vehicle is traveling. After a given coast traveling condition is satisfied, when the selected range detector detects the drive range, the coast idle stop control program performs the coast idle stop control, and when the selected range detector detects the manual range, the coast idle control program performs the coast idle control.

As described above, according to the control apparatus of the vehicle of the present invention, after the given coast traveling condition is satisfied, when the automatic transmission is controlled in the automatic transmission mode, the coast idle stop control program performs the coast idle stop control, and on the other hand, when the automatic transmission is controlled in the manual transmission mode, the coast idle control program performs the coast idle control. Therefore, a quick response is achieved by the manual transmission mode in which the quick response to the operator's re-acceleration or engine-brake request is needed, while improving the fuel consumption as much as possible.

DETAILED DESCRIPTION OF EMBODIMENTS

Hereinafter, one embodiment of the present invention is described in detail with reference to the accompanying drawings.

Figure 1:
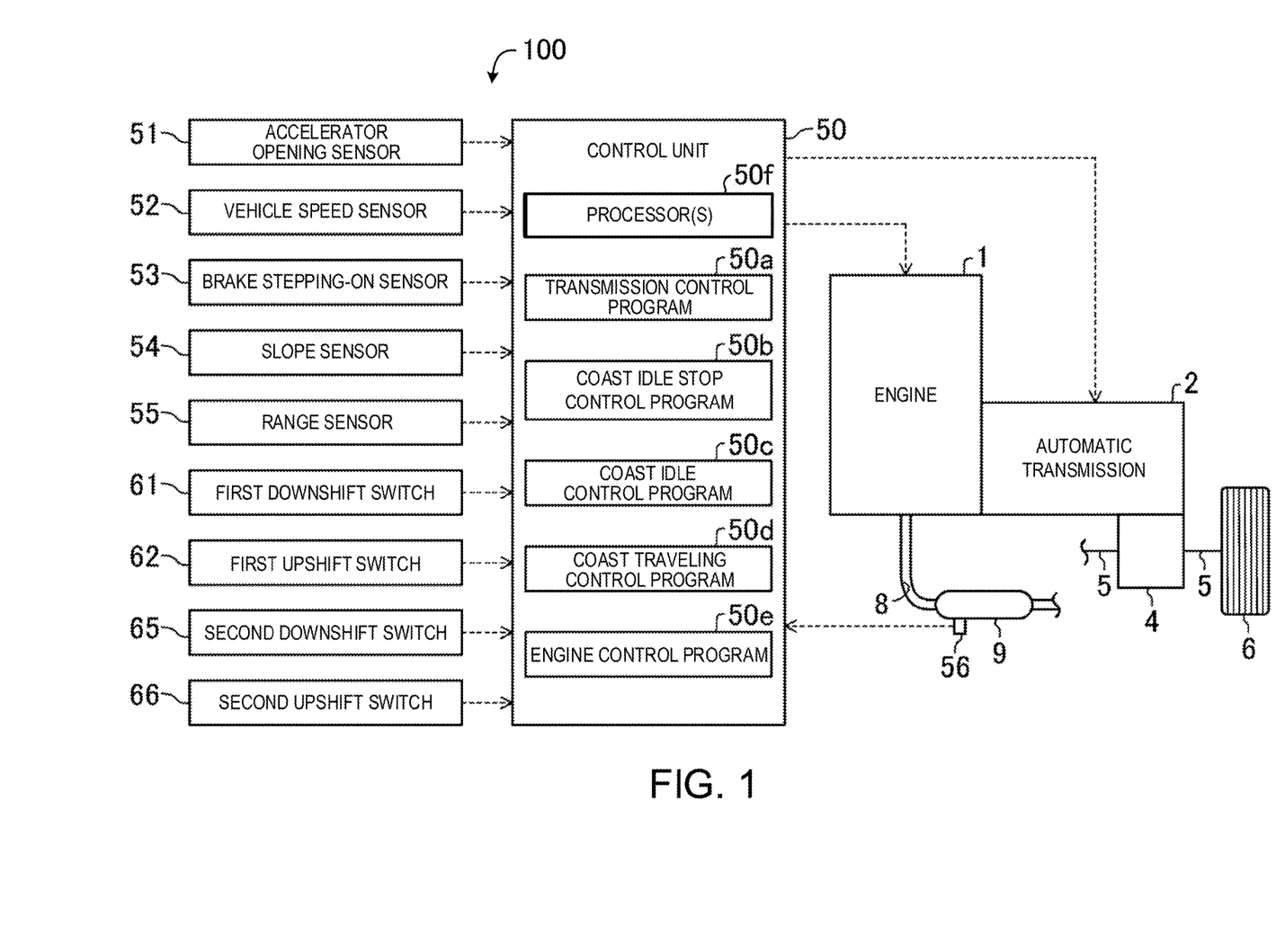
FIG. 1 is a block diagram illustrating configurations of a vehicle control apparatus and a power transmission system for an engine, according to one embodiment of the present invention.

FIG. 1 illustrates configurations of a vehicle control apparatus 100 and a power transmission system for an engine 1, according to this embodiment. This vehicle (automobile in this embodiment) includes, in addition to the engine 1, an automatic transmission 2 intervening, on the power transmission path, between the engine 1 and front wheels 6 (only right front wheel is illustrated in FIG. 1). An output shaft (crankshaft) of the engine 1 is coupled to an input shaft of the automatic transmission 2, and the output shaft of the engine 1 and the input shaft of the automatic transmission 2 extend in vehicle width (lateral) directions. Power is transmitted from the automatic transmission 2 to a differential 4, and the front wheels 6 are driven via left and right drive shafts 5 by the power transmitted to the differential 4.

An emission control device 9 with a catalyst is provided in an exhaust passage 8 of the engine 1 to purify exhaust gas from the engine 1. The emission control device 9 is provided with an emission control device temperature sensor 56, as an emission control device temperature detector, to detect a temperature of the emission control device 9.

The vehicle is also provided with a control unit 50 which controls operations of the engine 1 and the automatic transmission 2. The control unit 50 is a controller based on one or more well-known microcomputers, and includes one or more processor 50f, e.g., central processing units (CPUs), which execute one or more computer readable programs, one or more memories which are comprised of, for example, one or more RAMs and/or ROMs, and store the programs and associated data, and an input-and-output (I/O) bus through which electrical signals are inputted and outputted.

Inputted into the control unit 50 are a signal from an accelerator opening sensor 51 which detects a stepping-on amount of an accelerator pedal by a vehicle operator (accelerator opening), a signal from a vehicle speed sensor 52 which detects a traveling vehicle speed, a signal from a brake stepping-on sensor 53 which detects a stepping-on amount of a brake pedal by the operator, a signal from a slope sensor 54 which detects a slope of a traveling way of the vehicle, a signal from a range sensor 55 (which constitutes a selected range detector) which detects a range of a shift lever or shift stick 21 (see FIG. 2) of the vehicle, a signal from the emission control device temperature sensor 56, a signal from a first downshift switch 61 (described later), a signal from a first upshift switch 62 (described later), a signal from a second downshift switch 65 (described later), and a signal from a second upshift switch 66 (described later). Also inputted into the control unit 50 are signals required for control of the engine 1 during a normal traveling of the vehicle that is traveling conditions other than a coast traveling. Note that, in this embodiment, the slope (%) of the traveling way that is detected by the slope sensor 54 indicates a negative value at a downhill and a positive value at an uphill.

The control unit 50 controls operations of the automatic transmission 2 while controlling the operation of the engine 1, based on the inputted signals. The automatic transmission 2 may be a plurality of engageable elements, such as clutch(es) and brake(s), and in this embodiment, may be friction engageable elements.

The control unit 50 is provided therein with a transmission control program 50a, a coast idle stop control program 50b, a coast idle control program 50c, and a coast traveling control program 50d, and an engine control program 50e which controls the engine 1 during the normal traveling.

The transmission control program 50a determines, during the normal traveling, when the shift stick 21 is located at Drive range or D-range, a gear ratio using a gear map stored beforehand in the memory of the control unit 50 based on the vehicle traveling state (in detail, based on the signals from the accelerator opening sensor 51 and the vehicle speed sensor 52), and then controls engagement/disengagement of each engageable element to achieve the determined gear ratio.

In this embodiment, the transmission control program 50a is configured to control the automatic transmission 2 during the normal traveling so that the automatic transmission 2 is switched between an automatic transmission mode in which the gear ratio of the automatic transmission 2 is switched automatically according to a traveling state of the vehicle as described above and a manual transmission mode in which the gear ratio is switched manually by the operator.

Figure 2:
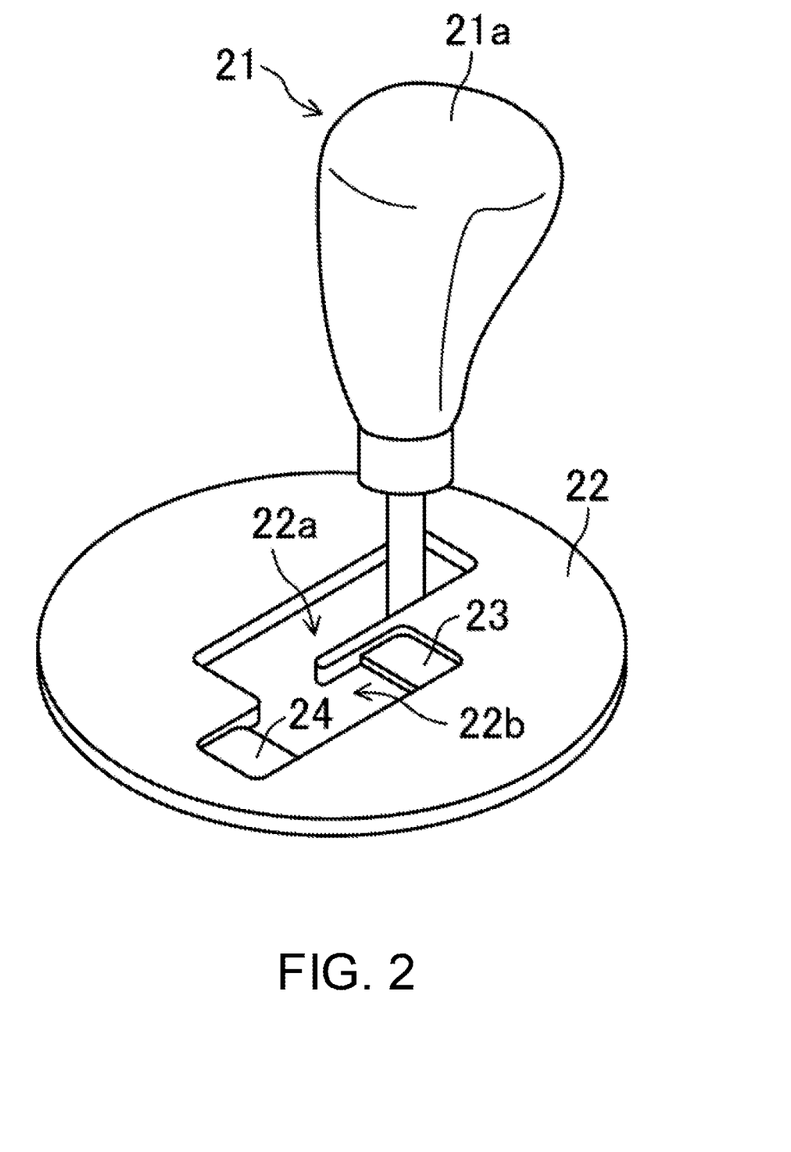
FIG. 2 is a perspective view illustrating a shift stick and a guide member.

As illustrated in FIG. 2, the vehicle is provided with the shift stick 21 for the operator to switch the gear ratio of the automatic transmission 2. A shift knob 21a where the operator grips is provided to a top end of the shift stick 21.

The shift stick 21 is operable along an operation path of an approximately L-shape which is defined by a guide hole 22a formed in a guide member 22, and along the operation path, P-range, R-range, N-range, D-range, and M-range are prepared. P-range, R-range, N-range, and D-range are located in this order from front in a vehicle longitudinal direction (front-to-rear direction). M-range is located toward an operator's seat with respect to D-range in a vehicle width direction, and the shift stick 21 is switchable between D-range and M-range (neutral position, described later) by being operated in the vehicle width directions.

Thus, as the positions of the shift stick 21, D-range at which the operator selects the automatic transmission mode and M-range at which the operator selects the manual transmission mode are defined.

M-range has an M-range operating area 22b which is elongated in the vehicle longitudinal directions, and the shift stick 21 is operable by the operator forward and rearward from the neutral position located at the center of the M-range operating area 22b. When the shift stick 21 is located at a position offset from the neutral position in the M-range operating area 22b, the shift stick 21 is biased toward the neutral position by a biasing mechanism (not illustrated). Therefore, the shift stick 21 is always located at the neutral position when it is not operated in M-range (M-range operating area 22b) by the operator.

In this embodiment, when the operator operates the shift stick 21 forward from the neutral position in the M-range operating area 22b (a downshift operation), the gear ratio of the automatic transmission 2 is downshifted from a gear ratio which has been set previously (current gear ratio), and on the other hand, when the operator operates the shift stick 21 from the neutral position rearward (an upshift operation), the gear ratio is upshifted from the current gear ratio. Thus, the shift stick 21 also functions as an operating member for manual transmission.

A front stop 23 and a rear stop 24 which respectively define a front end and a rear end of the M-range operating area 22b, are provided in the guide member 22. A first downshift switch 61 (only illustrated in FIG. 1) which detects a downshift operation by the operator is provided to the front stop 23, and a first upshift switch 62 (only illustrated in FIG. 1) which detects an upshift operation by the operator is provided to the rear stop 24. Thus, when the first downshift switch 61 is once turned ON by a downshift operation by the operator, the transmission control program 50a downshifts the current gear ratio of the automatic transmission 2 by one gear, and on the other hand, when the first upshift switch 62 is once turned ON by an upshift operation by the operator, the transmission control program 50a upshifts the current gear ratio of the automatic transmission 2 by one gear.

Figure 3:
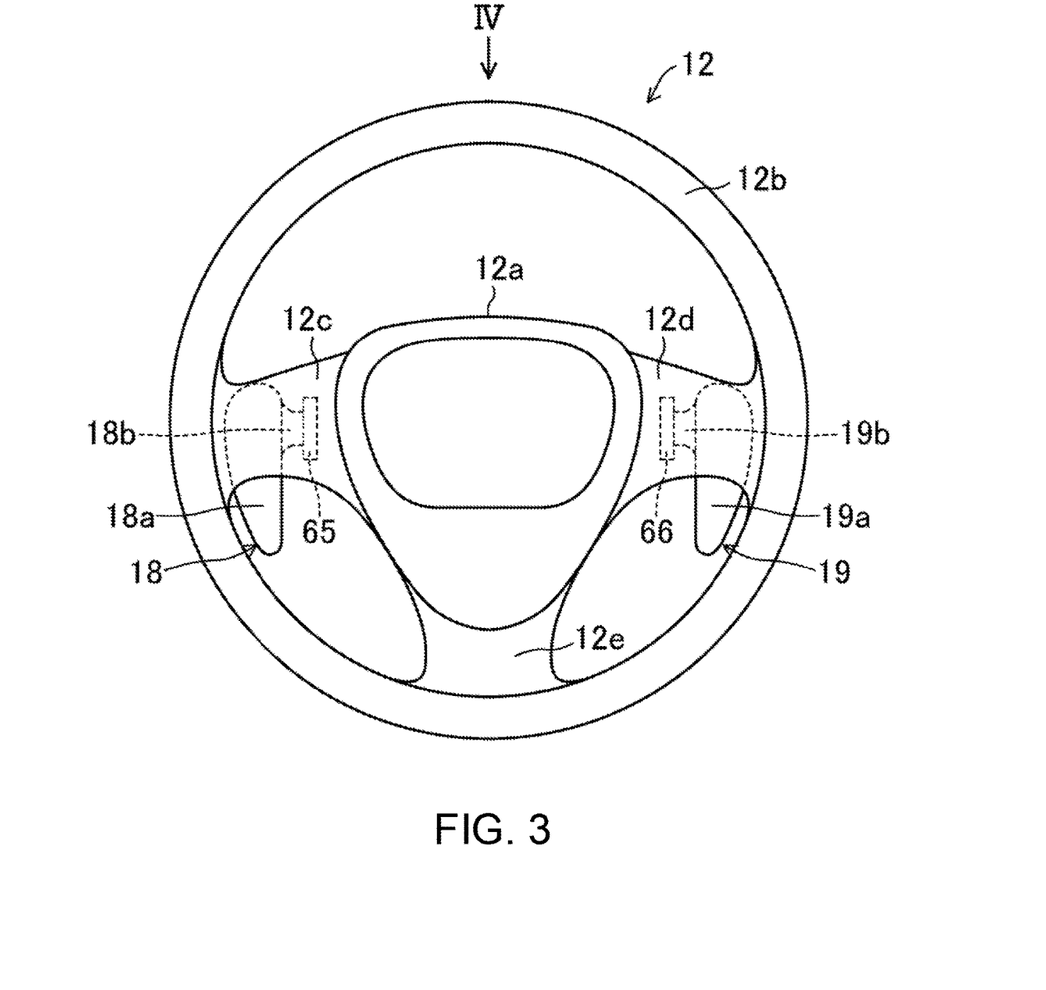
FIG. 3 is an elevational view illustrating a steering wheel.
Figure 4:
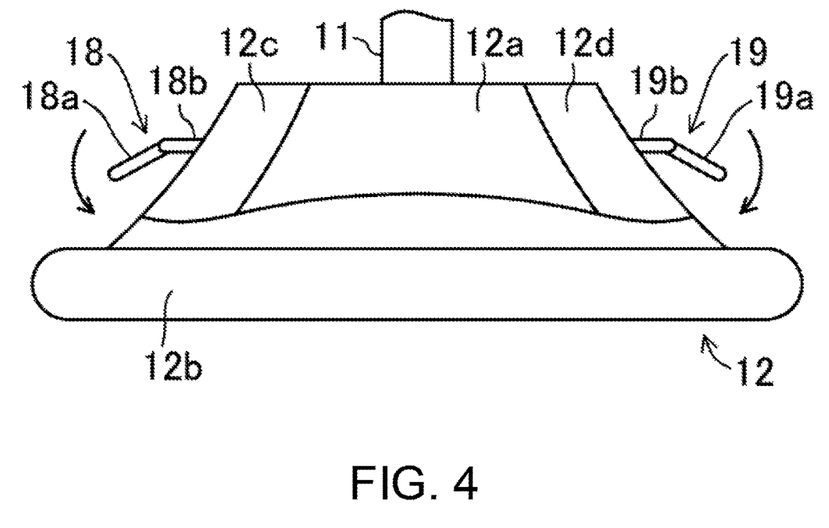
FIG. 4 is a plan view illustrating the steering wheel, seen in an arrow IV direction of FIG. 3.

As illustrated in FIGS. 3 and 4, in this embodiment, additional manual transmission operating members (e.g., a downshift operating member 18 and an upshift operating member 19) to the shift stick 21 are provided to a steering wheel 12 of the vehicle.

The steering wheel 12 is comprised of a paddle part 12a which is located at the center of the steering wheel 12 and fixedly coupled to a steering column 11, a wheel part 12b where the operator grabs by hands, and a plurality of spokes which connect the wheel part 12b with the paddle part 12a. In this embodiment, these spokes are a left spoke 12c which extends to the left from the paddle part 12a when seen from the front side of the steering wheel 12 (i.e., seen from rear side of the vehicle), a right spoke 12d which extends to the right, and a lower spoke 12e which extends downwardly, when the steering wheel 12 is located at its neutral position (e.g., the vehicle is traveling straight forward).

The downshift operating member 18 and the upshift operating member 19 are located in front faces of the left spoke 12c and the right spoke 12d, respectively. The downshift operating member 18 and the upshift operating member 19 have operating parts 18a and 19a, respectively, which are located near operator's fingers of each of left and right hands (i.e., other than thumbs) when he/she grabs the wheel part 12b. The operating parts 18a and 19a extend vertically so that they are operable by the operator's fingers. The operating parts 18a and 19a are supported by the left spoke 12c and the right spoke 12d through support parts 18b and 19b, respectively, so as to be pivotable in the vehicle longitudinal directions. A downshift or upshift operation is possible by pressing the operating part 18a or 19a rearward (see arrows in FIG. 4) with the fingers contacting from a front surface of the operating parts 18a or 19a.

The operating parts 18a and 19a are limited in their pivoting range and are movable between an initial operating position and a final operating position so as to move from the initial operating position to the final operating position by the pressing described above, respectively. The operating parts 18a and 19a are biased toward their initial operating positions, and they are always located at the initial operating position when they are not operated.

The left spoke 12c is provided with the second downshift switch 65 which is turned ON just before the final operating position of the downshift operating member 18 when the downshift operation is carried out, while the right spoke 12d is provided with the second upshift switch 66 which is turned ON just before the final operating position of the upshift operating member 19 when the upshift operation is carried out.

The downshift operating member 18 and the upshift operating member 19 are operable while the shift stick 21 is located at D-range when the vehicle is traveling. The transmission control program 50a controls the automatic transmission 2 in the manual transmission mode even when the shift stick 21 is located at D-range, if the second downshift switch 65 or the second upshift switch 66 has been turned ON. That is, the transmission control program 50a changes the gear ratio according to the operation of the upshift operating member 19 or the downshift operating member 18 when the shift stick 21 is at D-range. Note that the transmission control program 50a controls temporarily in the manual transmission mode for a preset period (e.g., 2 to 5 seconds) after the second downshift switch 65 or the second upshift switch 66 is turned ON when the shift stick 21 is at D-range.

Thus, the transmission control program 50a constitutes a transmission mode switching control program which controls the automatic transmission 2 so that the automatic transmission 2 is switched between the automatic transmission mode and the manual transmission mode.

Note that the transmission control program 50a also switches the mode between the automatic transmission mode and the manual transmission mode when a coast idle stop control (described later) or a coast idle control (described later) is performed. In the manual transmission mode, the transmission control program 50a detects the downshift operation and the upshift operation by the operator; however, an actual gear change will not take place in the automatic transmission 2 because the gear is at the neutral position as will be described later the coast idle stop control or the coast idle control is performed.

The coast idle stop control program 50b performs the coast idle stop control in which the engine 1 is stopped automatically and the automatic transmission 2 is changed into the neutral position while the vehicle is traveling. That is, the coast idle stop control program 50b constitutes a coast idle stop control program.

The coast idle control program 50c performs a coast idle control in which the engine 1 is made running idle and the automatic transmission 2 is changed into the neutral position while the vehicle is traveling. That is, the coast idle control program 50c constitutes a coast idle control program. The term "idle" as used herein also includes a case when the engine 1 is operated at an engine speed somewhat higher than a normal idle engine speed because auxiliary machineries (e.g., a compressor of an air-conditioner) of the engine 1 may be driven.

In order for the vehicle to carry out the coast traveling when the given coast traveling condition is satisfied, the coast traveling control program 50d causes the coast idle stop control program 50b to perform the coast idle stop control (outputs a coast idle stop control performance instruction for performing the coast idle stop control to the coast idle stop control program 50b), or causes the coast idle control program 50c to perform the coast idle control (outputs a coast idle control performance instruction for performing the coast idle control to the coast idle control program 50c). That is, the coast traveling control program 50d constitutes a coast traveling control program.

The given coast traveling condition includes a condition in which a vehicle speed detected by the vehicle speed sensor 52 is faster than a given speed, the stepping-on amount of the accelerator pedal detected by the accelerator opening sensor 51 is less than a first given amount, and the stepping-on amount of the brake pedal detected by the brake stepping-on sensor 53 is less than a second given amount.

The given speed is a minimum vehicle speed (e.g., several dozen km/h) when the operator coast-travels the vehicle. The first given amount is a value near zero when the accelerator pedal is almost not operated (i.e., substantially judged not to be operated). The second given amount is a value near zero when the brake pedal is almost not operated (i.e., substantially judged not to be operated).

In this embodiment, the given coast traveling condition further includes a condition in which the slope detected by the slope sensor 54 is less than a positive preset value, and a condition in which the temperature of the emission control device 9 detected by the emission control device temperature sensor 56 is higher than the activation temperature of the catalyst of the emission control device 9. The preset value is such a positive value that the vehicle slows down immediately even if the vehicle tries to carry out the coast traveling when the slope is above the preset value. For example, if the traveling way is an uphill with a comparatively small slope, a flat or leveled road, or a downhill, the condition in which the slope detected by the slope sensor 54 is less than the preset value is satisfied.

In this embodiment, when the vehicle is traveling higher than the given speed, the shift stick 21 is considered to be at D-range or M-range. However, if the shift stick 21 may be considered to be at N-range, the given coast traveling condition may also include a condition in which the shift stick 21 is at D-range or M-range.

When the transmission control program 50a controls the automatic transmission 2 in the automatic transmission mode when the given coast traveling condition is satisfied, the coast traveling control program 50d causes the coast idle stop control program 50b to perform the coast idle stop control, and on the other hand, when the transmission control program 50a controls the automatic transmission 2 in the manual transmission mode, the coast traveling control program 50d causes the coast idle control program 50c to perform the coast idle control. Thus, the manual transmission mode when the coast traveling control program 50d causes the coast idle control program to perform the coast idle control includes the temporary manual transmission mode in which the automatic transmission 2 is controlled temporarily in the manual transmission mode. For example, when the given coast traveling condition is satisfied, the shift stick 21 is at D-range, and the transmission control program 50a controls the automatic transmission 2 in the temporary manual transmission mode in accordance with the operation of the downshift operating member 18 or the upshift operating member 19 provided to the steering wheel 12, the coast traveling control program 50d causes the coast idle control program 50c to perform the coast idle control.

Figure 5:
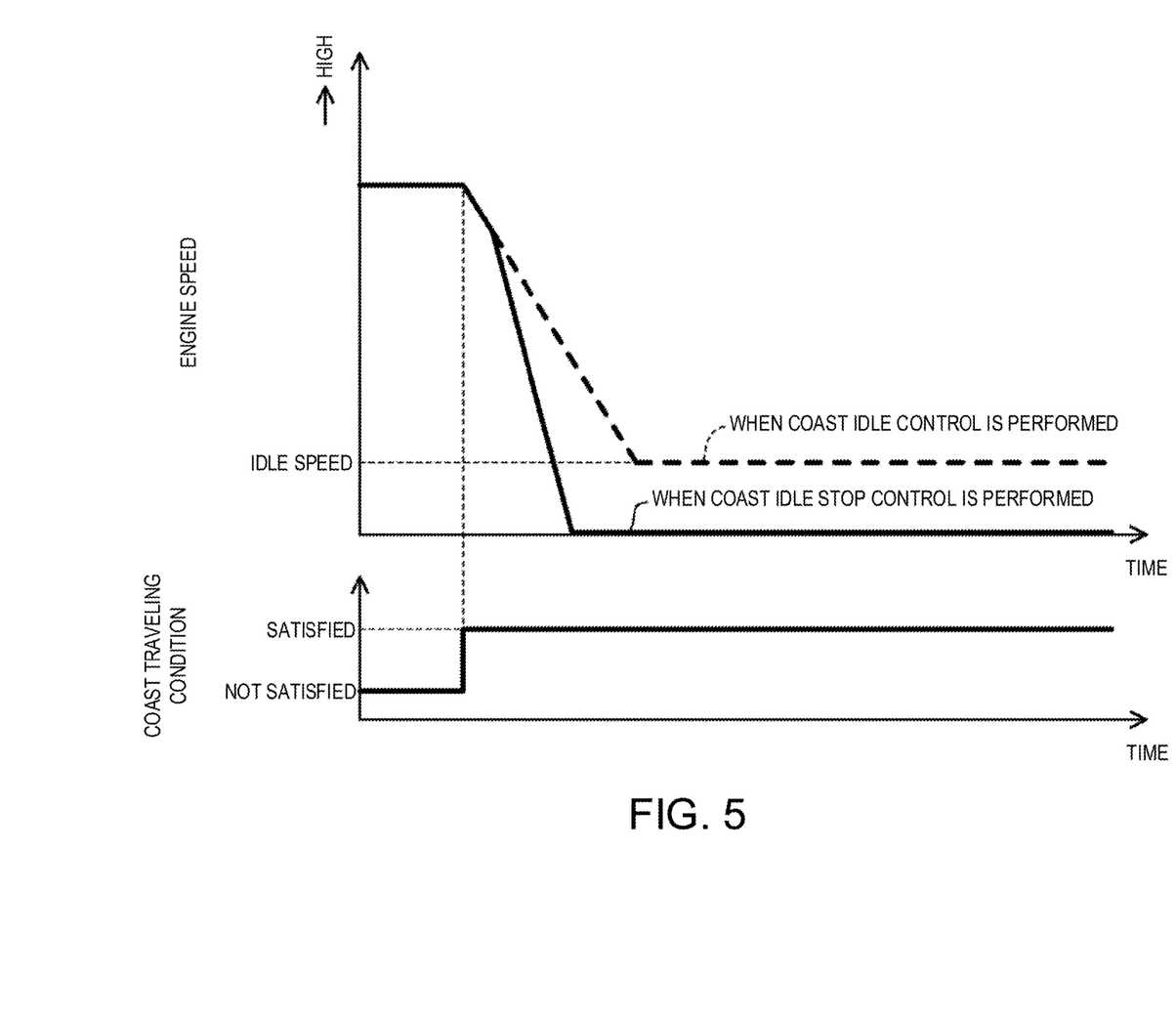
FIG. 5 is a timing chart illustrating changes in an engine speed after a given coast traveling condition is satisfied, under an execution of a coast idle control and an execution of a coast idle stop control.

As illustrated in FIG. 5, when the given coast traveling condition is satisfied and the coast idle control is performed, the engine speed of the engine 1 falls gradually from an engine speed before the given coast traveling condition is satisfied, and then falls to the idle engine speed.

On the other hand, when the given coast traveling condition is satisfied and the coast idle stop control is performed, the engine speed falls at a rate substantially the same as that of the coast idle control, and then falls at a faster rate than that of the coast idle control until the engine speed reaches zero, unless the automatic transmission 2 is changed into the neutral position.

During the execution of the coast idle stop control by the coast idle stop control program 50b, when the transmission control program 50a switches the mode from the automatic transmission mode to the manual transmission mode (including the temporary manual transmission mode), i.e., when the shift stick 21 is operated from D-range to M-range, or when the downshift operating member 18 or the upshift operating member 19 is operated while the shift stick is at D-range so that the second downshift switch 65 or the second upshift switch 66 is turned ON, the coast traveling control program 50d causes the coast idle control program 50c to perform the coast idle control.

On the other hand, while the coast idle control is performed by the coast idle control program 50c, when the transmission control program 50a switches the mode from the manual transmission mode (including the temporary manual transmission mode) to the automatic transmission mode, that is, when the shift stick 21 is operated from M-range to D-range, or when the preset period has passed since the second downshift switch 65 or the second upshift switch 66 is turned ON in the temporary manual transmission mode, the coast traveling control program 50d causes the coast idle stop control program 50b to perform the coast idle stop control.

Figure 6:
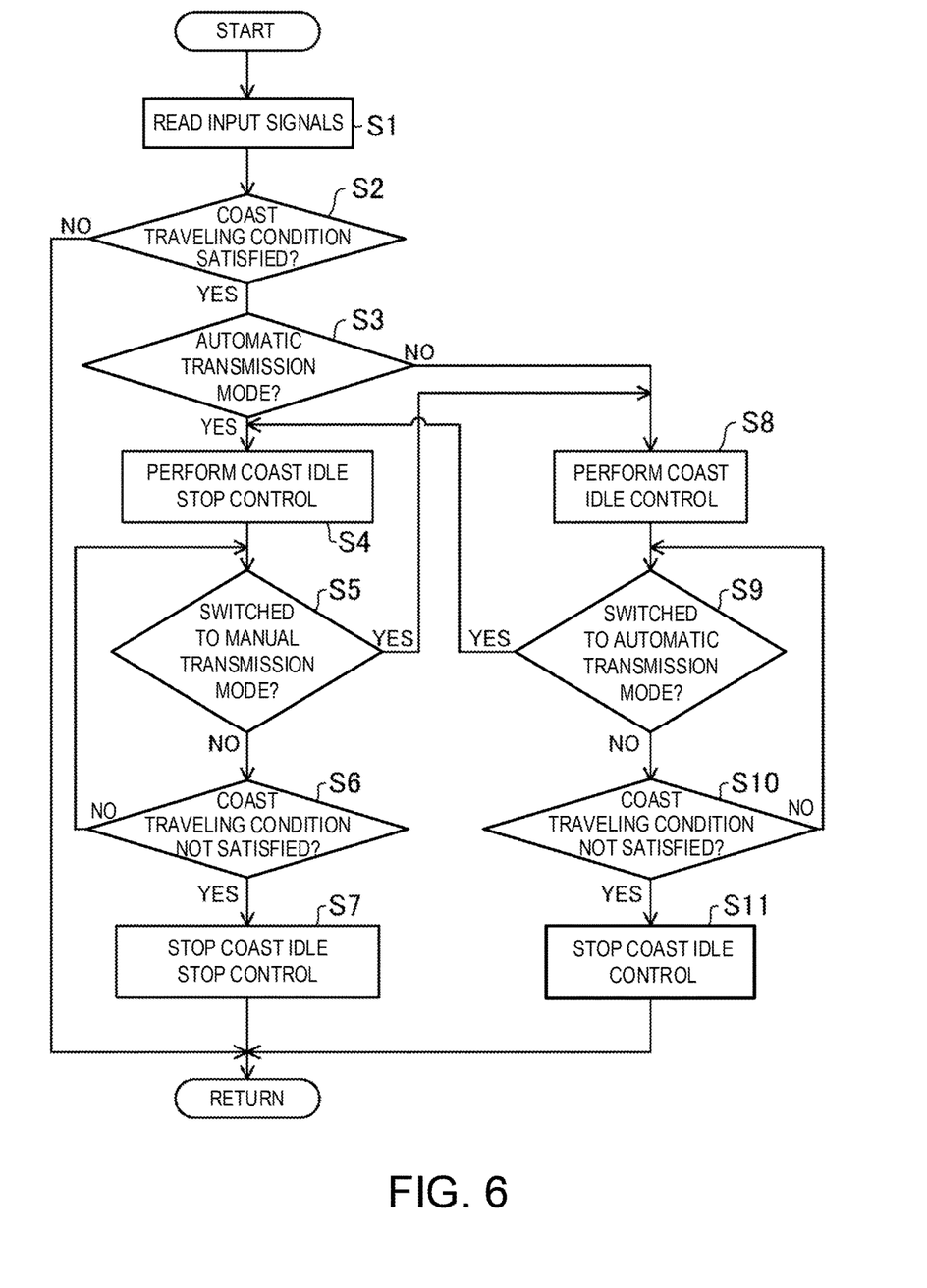
FIG. 6 is a flowchart illustrating a control at the time of a coast traveling by a control unit.

Note that while the coast idle stop control is performed by the coast idle stop control program 50b, when a rate of change in the vehicle speed detected by the vehicle speed sensor 52 is more than a given rate of change (including both cases when the vehicle speed changes faster and slower), the coast traveling control program 50d may be desired to be configured so that it causes the coast idle control program 50c to perform the coast idle control (this configuration is not included in the flowchart of FIG. 6). The rate of change in the vehicle speed being more than the given rate of change is when the possibility of the operator requesting a re-acceleration becomes high (when the vehicle slows down), or when the possibility of the operator requesting an engine brake becomes high (when the vehicle accelerates).

Moreover, while the coast idle control is performed by the coast idle control program 50c, when the rate of change in the vehicle speed detected by the vehicle speed sensor 52 is less than a preset rate (including both cases when the vehicle speed changes faster and slower), the coast traveling control program 50d may be desired to be configured so that it causes the coast idle stop control program 50b to perform the coast idle stop control (this configuration is not included in the flowchart of FIG. 6). This preset rate may be similar or the same value to/as the given rate described in the previous paragraph.

Note that when the temperature of the emission control device 9 detected by the emission control device temperature sensor 56 is higher than the activation temperature of the catalyst of this emission control device 9 and lower than a given temperature which is higher than the activation temperature of the catalyst, the coast traveling control program 50d may be desired to be configured so that it causes the coast idle control program 50c to perform the coast idle control even when the given coast traveling condition is satisfied and the transmission control program 50a controls the automatic transmission 2 in the automatic transmission mode (this configuration is not included in the flowchart of FIG. 6). The given temperature is a maximum value of the temperature of the emission control device 9 which becomes lower than the activation temperature when the coast idle stop control is performed.

While the coast idle stop control is performed by the coast idle stop control program 50b, when the given coast traveling condition is not satisfied, the coast traveling control program 50d stops the performance of the coast idle stop control by the coast idle stop control program 50b (outputs the coast idle stop control stop instruction for stopping the performance of the coast idle stop control to the coast idle stop control program 50b). Thus, the engine control program 50e restarts the engine 1 and performs the engine control for the normal traveling, while the transmission control program 50a changes engagement/disengagement of the engageable elements of the automatic transmission 2 corresponding to the gear ratio determined in the gear map.

Similarly, while the coast idle control is performed by the coast idle control program 50c, when the given coast traveling condition is not satisfied, the coast traveling control program 50d stops the performance of the coast idle control by the coast idle control program 50c (outputs the coast idle control stop instruction for stopping the performance of the coast idle control to the coast idle control program 50c). Thus, the engine control program 50e performs the engine control for the normal traveling, and the transmission control program 50a once changes engagement/disengagement of the engageable elements of the automatic transmission 2 corresponding to the previous gear ratio which is set by the operator before or while the coast idle control is performed, and it then changes the engagement/disengagement corresponding to the gear ratio which is set by the downshift or upshift operation by the operator.

Referring now to the flowchart of FIG. 6, the control by the control unit 50 during the coast traveling (which is basically performed by the coast traveling control program 50d) is described.

At Step S1, the coast traveling control program 50d first reads the input signals from the various sensors and switches, and at Step S2, the coast traveling control program 50d then determines whether the given coast traveling condition is satisfied. If the determination of Step S2 is NO, the coast traveling control program 50d returns to Step S1, and on the other hand, if the determination of Step S2 is YES, the coast traveling control program 50d transits to Step S3.

At Step S3, the coast traveling control program 50d determines whether the transmission control program 50a controls the automatic transmission 2 in the automatic transmission mode. If the determination of Step S3 is YES, the coast traveling control program 50d transits to Step S4, and on the other hand, if the determination of Step S4 is NO, the coast traveling control program 50d transits to Step S8.

At Step S4, the coast traveling control program 50d causes the coast idle stop control program 50b to perform the coast idle stop control (outputs the coast idle stop control performance instruction to the coast idle stop control program 50b). Thus, the coast idle stop control program 50b stops the engine 1 automatically and changes the automatic transmission 2 into the neutral position.

At Step S5, the coast traveling control program 50d determines whether the transmission control program 50a switches the mode from the automatic transmission mode to the manual transmission mode (including the temporary manual transmission mode). If the determination of Step S5 is YES, the coast traveling control program 50d transits to Step S8, and on the other hand, if the determination of Step S5 is NO, the coast traveling control program 50d transits to Step S6 where it determines whether the given coast traveling condition is not satisfied.

If the determination of Step S6 is NO, the coast traveling control program 50d returns to Step S5. On the other hand, if the determination of Step S6 is YES, the coast traveling control program 50d transits to Step S7 where the coast idle stop control performed by the coast idle stop control program 50b is stopped (the coast idle stop control stop instruction is outputted to the coast idle stop control program 50b), and then returns to Step S1.

If the determination of Step S3 is NO, or at Step S8 after the determination of Step S5 is YES, the coast traveling control program 50d causes the coast idle control program 50c to perform the coast idle control (outputs the coast idle control performance instruction to the coast idle control program 50c). Thus, the coast idle control program 50c makes the engine 1 run idle, and changes the automatic transmission 2 into the neutral position. Note that, since the automatic transmission 2 has already been at the neutral position after Step S5, the engine 1 is made running idle and the automatic transmission 2 remains at the neutral position.

At Step S9, the coast traveling control program 50d determines whether the transmission control program 50a switches from the manual transmission mode (including the temporary manual transmission mode) to the automatic transmission mode. If the determination of Step S9 is YES, the coast traveling control program 50d transits to Step S4, and on the other hand, if the determination of Step S9 is NO, the coast traveling control program 50d transits to Step S10 where it determines whether the given coast traveling condition is not satisfied.

If the determination of Step S10 is NO, the coast traveling control program 50d returns to Step S9, and on the other hand, if the determination of Step S10 is YES, the coast traveling control program 50d transits to Step S11 where the coast idle control performed by the coast idle control program 50c is stopped (the coast idle control stop instruction is outputted to the coast idle control program 50c), and then returns to Step S1.

As described above, in this embodiment, the coast traveling control program 50d is configured so that, when the transmission control program 50a controls the automatic transmission 2 in the automatic transmission mode after the given coast traveling condition is satisfied, it causes the coast idle stop control program 50b to perform the coast idle stop control. Therefore, the improvement of fuel consumption is fully acquired.

Then, while the coast idle stop control is performed by the coast idle stop control program 50b, when the given coast traveling condition is not satisfied especially because the stepping-on amount of the accelerator pedal detected by the accelerator opening sensor 51 is more than the first given amount (i.e., the operator requests the re-acceleration) or the stepping-on amount of the brake pedal detected by the brake stepping-on sensor 53 reaches the second given amount (the operator requests the engine brake), the engine 1 is started and the automatic transmission 2 is changed into the non-neutral position to respond to such a request. Therefore, the response to the request may become slow.

However, since an ordinary operator normally selects the automatic transmission mode and then selects the manual transmission mode (including the temporary manual transmission mode) if he/she wants to enjoy a sporty drive, it is rare for the operator to request a quick response to the operator's re-acceleration or engine-brake request when the operator selects the automatic transmission mode. Therefore, there is no problem even if the response to the request is slow.

On the other hand, after the given coast traveling condition is satisfied, when the transmission control program 50a controls the automatic transmission 2 in the manual transmission mode (including the temporary manual transmission mode), the coast traveling control program 50d is configured so as to cause the coast idle control program 50c to perform the coast idle control. Thus, while the coast idle control is performed by the coast idle control program 50c, when the given coast traveling condition is not satisfied especially because the stepping-on amount of the accelerator detected by the accelerator opening sensor 51 is more than the first given amount (the operator requests the re-acceleration) or the stepping-on amount of the brake pedal detected by the brake stepping-on sensor 53 reaches the second given amount (the operator requests the engine brake), the engine 1 has already been in operation. Therefore, as a result, the response to the operator's re-acceleration or engine-brake request is improved. That is, the quick response is now achieved in the manual transmission mode (including the temporary manual transmission mode) where the quick response to the operator's re-acceleration or engine-brake request is needed.

The present invention is not limited to the above embodiment, and it can be substituted without departing from the spirit of the claims.

The above embodiment is merely an illustration, and should not be interpreted as limiting the scope of the present invention. The scope of the present invention is defined by the appended claims, and all of the modifications and changes that belong to equivalents of the claims fall into the scope of the present invention.

The present invention is useful to a control apparatus of a vehicle, which includes one or more processors configured to execute a transmission mode switching control program for controlling the automatic transmission to switch between an automatic transmission mode and a manual transmission mode, a coast idle stop control program for performing a coast idle stop control in which the engine is stopped automatically and the automatic transmission is changed into a neutral position while the vehicle is traveling, and a coast idle control program for performing a coast idle control in which the engine is made running idle and the automatic transmission is changed into the neutral position while the vehicle is traveling.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine
2 Automatic Transmission
6 Front Wheel (Wheel)
9 Emission Control Device
50 Control Unit
50a Transmission Control Program (Transmission Mode Switching Control Program)
50b Coast Idle Stop Control Program
50c Coast Idle Control Program
50d Coast Traveling Control Program
56 Emission Control Device Temperature Sensor (Emission Control Device Temperature Detector)

What is claimed is:

1. A control apparatus of a vehicle including an engine, and an automatic transmission provided in a power transmission path between the engine and wheels, comprising:
one or more processors configured to execute:
a transmission mode switching control program for controlling the automatic transmission to switch between an automatic transmission mode in which a gear ratio of the automatic transmission is changed automatically according to a traveling state of the vehicle and a manual transmission mode in which the gear ratio is changed manually by an operation of an operator of the vehicle;
a coast idle stop control program for performing a coast idle stop control in which the engine is stopped automatically and the automatic transmission is changed into a neutral position while the vehicle is traveling;
a coast idle control program for performing a coast idle control in which the engine is made running idle and the automatic transmission is changed into the neutral position while the vehicle is traveling; and
a coast traveling control program for causing the coast idle stop control program to perform the coast idle stop control or causing the coast idle control program to perform the coast idle control when a given coast traveling condition is satisfied, the given coast traveling condition being a condition in which a vehicle speed is faster than a given speed, a stepping-on amount of an accelerator pedal by the operator is less than a first given amount, and a stepping-on amount of a brake pedal by the operator is less than a second given amount,
wherein, after the given coast traveling condition is satisfied, when the transmission mode switching control program controls the automatic transmission in the automatic transmission mode, the coast traveling control program causes the coast idle stop control program to perform the coast idle stop control, and when the transmission mode switching control program controls the automatic transmission in the manual transmission mode, the coast traveling control program causes the coast idle control program to perform the coast idle control.

2. The control apparatus of claim 1, wherein, during the execution of the coast idle stop control by the coast idle stop control program, when the transmission mode switching control program switches the mode from the automatic transmission mode to the manual transmission mode, the coast traveling control program causes the coast idle control program to execute the coast idle control.

3. The control apparatus of claim 2, wherein, during the coast idle stop control performed by the coast idle stop control program, when a rate of change in the vehicle speed is greater than a given rate of change, the coast traveling control program causes the coast idle control program to perform the coast idle control.

4. The control apparatus of claim 3, wherein, during the coast idle control performed by the coast idle control program, when the transmission mode switching control program switches the mode from the manual transmission mode to the automatic transmission mode, the coast traveling control program causes the coast idle stop control program to perform the coast idle stop control.

5. The control apparatus of claim 4, wherein, during the coast idle control performed by the coast idle control program, when the rate of change in the vehicle speed is less than a preset rate, the coast traveling control program causes the coast idle stop control program to perform the coast idle stop control.

6. The control apparatus of claim 5, wherein an emission control device is provided in an exhaust passage of the engine, and the apparatus further comprises an emission control device temperature detector for detecting a temperature of the emission control device,
wherein, when the temperature of the emission control device detected by the emission control device temperature detector is higher than an activation temperature of a catalyst of the emission control device and lower than a given temperature that is higher than the activation temperature of the catalyst, and even when the transmission mode switching control program controls the automatic transmission in the automatic transmission mode after the given coast traveling condition is satisfied, the coast traveling control program causes the coast idle control program to perform the coast idle control.

7. The control apparatus of claim 6, wherein, when a shift stick of the vehicle is at a drive range, and a downshift or an upshift using a manual transmission operating member provided separately from the shift stick is performed by the operator, the transmission mode switching control program temporarily controls the automatic transmission in the manual transmission mode, and
wherein the manual transmission mode when the coast traveling control program causes the coast idle control program to perform the coast idle control includes the manual transmission mode when the transmission mode switching control program temporarily controls the automatic transmission in the manual transmission mode.

8. The control apparatus of claim 1, wherein, during the coast idle stop control performed by the coast idle stop control program, when a rate of change in the vehicle speed is greater than a given rate of change, the coast traveling control program causes the coast idle control program to perform the coast idle control.

9. The control apparatus of claim 8, wherein, during the execution of the coast idle control by the coast idle control program, when the transmission mode switching control program switches the mode from the manual transmission mode to the automatic transmission mode, the coast traveling control program causes the coast idle stop control program to perform the coast idle stop control.

10. The control apparatus of claim 9, wherein, during the execution of the coast idle control by the coast idle control program, when the rate of change in the vehicle speed is less than a preset rate, the coast traveling control program causes the coast idle stop control program to perform the coast idle stop control.

11. The control apparatus of claim 10, wherein an emission control device is provided in an exhaust passage of the engine, and the apparatus further comprises an emission control device temperature detector for detecting a temperature of the emission control device,
wherein, when the temperature of the emission control device detected by the emission control device temperature detector is higher than an activation temperature of a catalyst of the emission control device and lower than a given temperature that is higher than the activation temperature of the catalyst, and even when the transmission mode switching control program controls the automatic transmission in the automatic transmission mode after the given coast traveling condition is satisfied, the coast traveling control program causes the coast idle control program to perform the coast idle control.

12. The control apparatus of claim 11, wherein, when a shift stick of the vehicle is at a drive range, and a downshift or an upshift using a manual transmission operating member provided separately from the shift stick is performed by the operator, the transmission mode switching control program temporarily controls the automatic transmission in the manual transmission mode, and
wherein the manual transmission mode when the coast traveling control program causes the coast idle control program to perform the coast idle control includes the manual transmission mode when the transmission mode switching control program temporarily controls the automatic transmission in the manual transmission mode.

13. The control apparatus of claim 1, wherein, during the coast idle control performed by the coast idle control program, when the transmission mode switching control program switches the mode from the manual transmission mode to the automatic transmission mode, the coast traveling control program causes the coast idle stop control program to perform the coast idle stop control.

14. The control apparatus of claim 13, wherein, during the coast idle control perform by the coast idle control program, when the rate of change in the vehicle speed is less than a preset rate, the coast traveling control program causes the coast idle stop control program to perform the coast idle stop control.

15. The control apparatus of claim 14, wherein an emission control device is provided in an exhaust passage of the engine, and the apparatus further comprises an emission control device temperature detector for detecting a temperature of the emission control device,
wherein, when the temperature of the emission control device detected by the emission control device temperature detector is higher than an activation temperature of a catalyst of the emission control device and lower than a given temperature that is higher than the activation temperature of the catalyst, and even when the transmission mode switching control program controls the automatic transmission in the automatic transmission mode after the given coast traveling condition is satisfied, the coast traveling control program causes the coast idle control program to perform the coast idle control.

16. The control apparatus of claim 1, wherein, during the execution of the coast idle control by the coast idle control program, when the rate of change in the vehicle speed is less than a preset rate, the coast traveling control program causes the coast idle stop control program to perform the coast idle stop control.

17. The control apparatus of claim 1, wherein an emission control device is provided in an exhaust passage of the engine, and the apparatus further comprises an emission control device temperature detector for detecting a temperature of the emission control device, wherein, when the temperature of the emission control device detected by the emission control device temperature detector is higher than an activation temperature of a catalyst of the emission control device and lower than a given temperature that is higher than the activation temperature of the catalyst, and even when the transmission mode switching control program controls the automatic transmission in the automatic transmission mode after the given coast traveling condition is satisfied, the coast traveling control program causes the coast idle control program to perform the coast idle control.

18. The control apparatus of claim 1, wherein, when a shift stick of the vehicle is at a drive range, and a downshift or an upshift using a manual transmission operating member provided separately from the shift stick is performed by the operator, the transmission mode switching control program temporarily controls the automatic transmission in the manual transmission mode, and wherein the manual transmission mode when the coast traveling control program causes the coast idle control program to perform the coast idle control includes the manual transmission mode when the transmission mode switching control program temporarily controls the automatic transmission in the manual transmission mode.

19. A control apparatus of a vehicle including an engine, and an automatic transmission provided in a power transmission path between the engine and wheels, comprising:
one or more processors configured to execute:
a transmission mode switching control program for controlling the automatic transmission to switch between an automatic transmission mode in which a gear ratio of the automatic transmission is changed automatically according to a traveling state of the vehicle and a manual transmission mode in which the gear ratio is changed manually by an operation of an operator of the vehicle;
a coast idle stop control program for performing a coast idle stop control in which the engine is stopped automatically and the automatic transmission is changed into a neutral position while the vehicle is traveling; and
a coast idle control program for performing a coast idle control in which the engine is made running idle and the automatic transmission is changed into the neutral position while the vehicle is traveling,
wherein, after a given coast traveling condition is satisfied, when the transmission mode switching control program controls the automatic transmission in the automatic transmission mode, the coast idle stop control program performs the coast idle stop control, and when the transmission mode switching control program controls the automatic transmission in the manual transmission mode, the coast idle control program performs the coast idle control.

20. A control apparatus of a vehicle including an engine, and an automatic transmission provided in a power transmission path between the engine and wheels, comprising:
a selected range detector for detecting which range is selected, between a drive range in which a gear ratio of the automatic transmission is changed automatically according to a traveling state of the vehicle and a manual range in which the gear ratio is changed manually by an operation of an operator of the vehicle; and
one or more processors configured to execute:
a coast idle stop control program for performing a coast idle stop control in which the engine is stopped automatically and the automatic transmission is changed into a neutral position while the vehicle is traveling; and
a coast idle control program for performing a coast idle control in which the engine is made running idle and the automatic transmission is changed into the neutral position while the vehicle is traveling,
wherein, after a given coast traveling condition is satisfied, when the selected range detector detects the drive range, the coast idle stop control program performs the coast idle stop control, and when the selected range detector detects the manual range, the coast idle control program performs the coast idle control.

* * * * *